W. F. PFAU.
WHEEL.
APPLICATION FILED MAR. 23, 1917.
1,339,574.
Patented May 11, 1920.
3 SHEETS—SHEET 1.
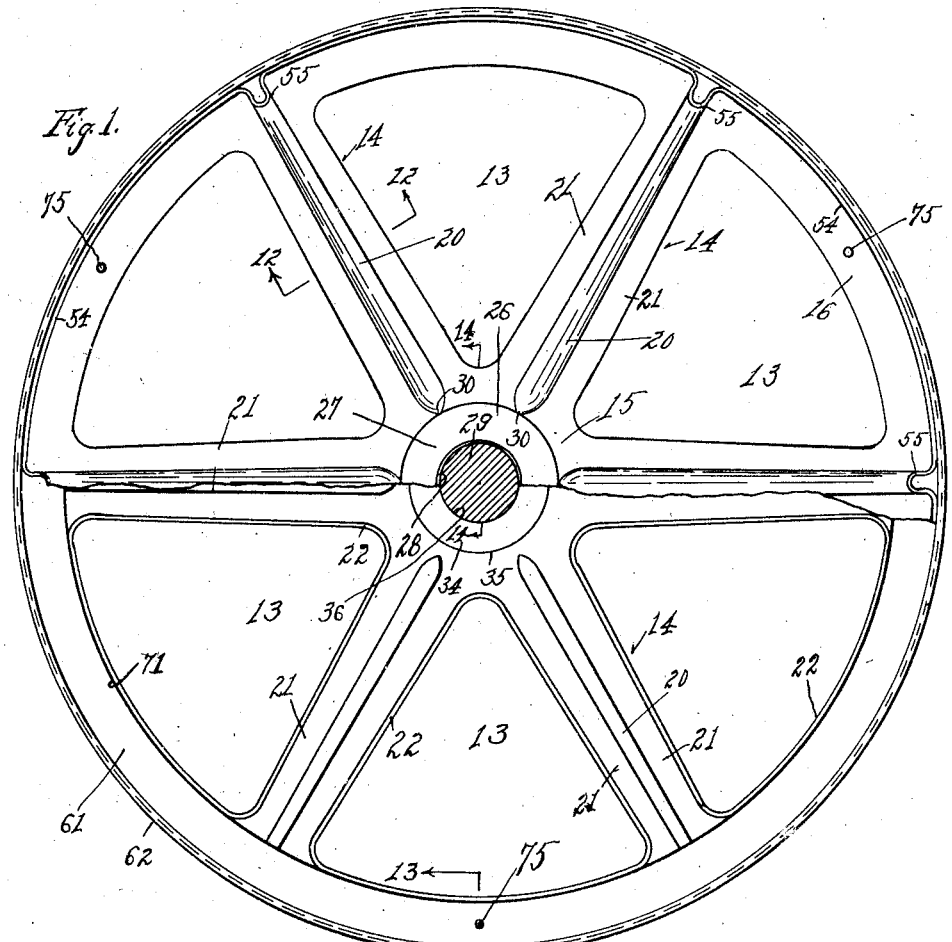

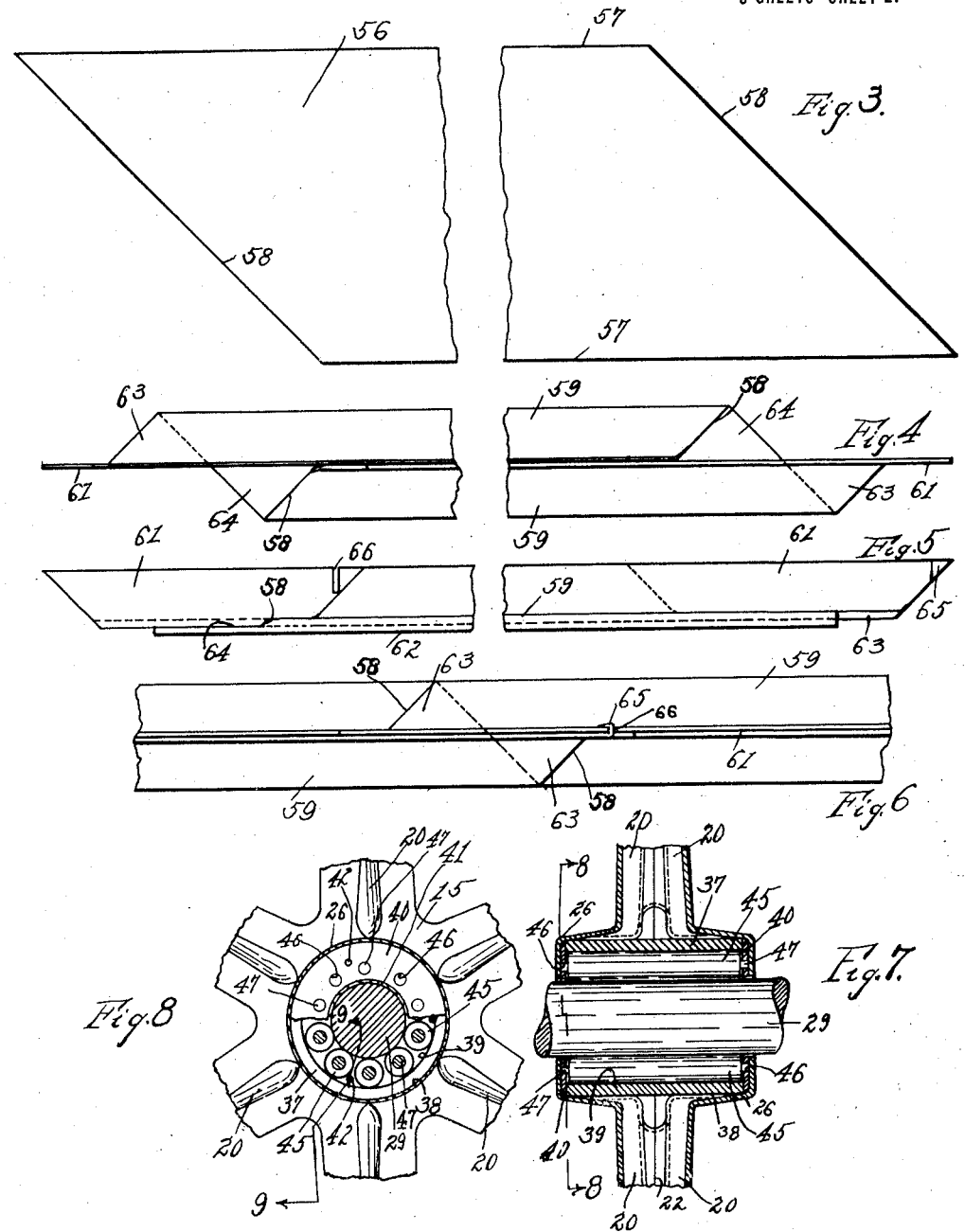

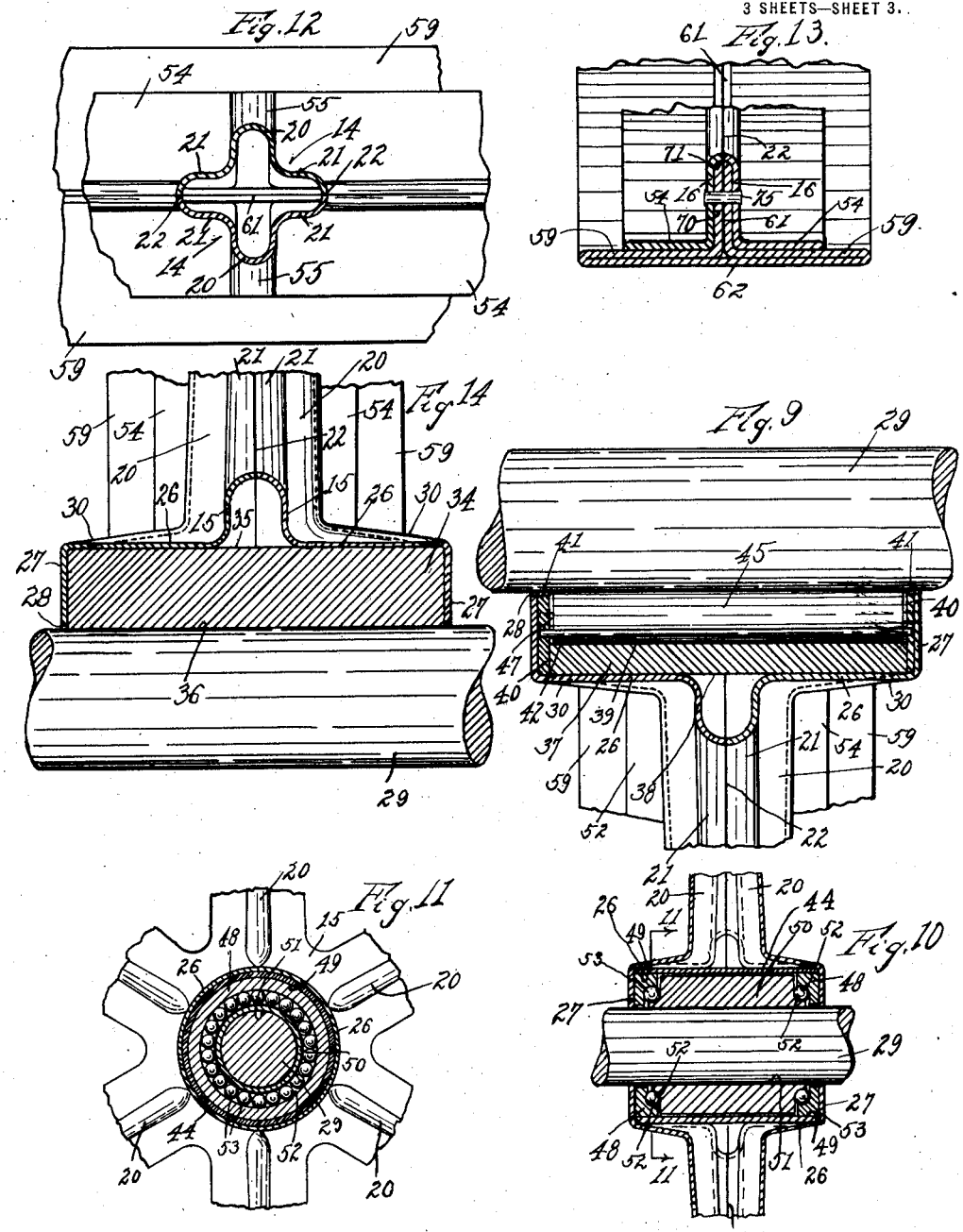

UNITED STATES PATENT OFFICE.

WILLIAM F. PFAU, OF CINCINNATI, OHIO.

WHEEL.

1,339,574.　　　　Specification of Letters Patent.　　Patented May 11, 1920.

Application filed March 23, 1917. Serial No. 157,000.

*To all whom it may concern:*

Be it known that I, WILLIAM F. PFAU, a citizen of the United States, residing at Cincinnati, in the county of Hamilton and State of Ohio, have invented certain new and useful Improvements in Wheels, of which the following is a specification.

My invention relates to wheels preferably formed from sheet metal, and adapted for use as vehicle wheels, pulleys, casters, or like structures, and has for its object the provision of a wheel having a novel hub structure pressed from the blanks forming the sides of the wheel; further, the provision of a rim for the wheel having its ends connected by a joint of rigid construction arranged to provide a smooth contact surface for the rim; and, further, to support the rim by a peripheral flange of novel construction pressed from the wheel-forming blanks.

Further, it is an object of my invention to form a wheel of novel, strong and durable construction, but which will be relatively light and inexpensive to manufacture.

Other objects of my invention will be readily understood from the following description and claims, and from the drawings.

For convenience and brevity I shall in the description and claims refer to the device to which my invention is applied, as a wheel, and include within this designation wheels, pulleys, casters, and similar articles.

In the drawings:

Figure 1 represents a side elevation of the wheel with one of the sides partly broken away.

Fig. 2 is an edge view of the same, partly in axial section.

Fig. 3 is a plan view of the blank from which the rim is formed, before bending the same, and having its central portion broken away.

Fig. 4 is a plan view of the bent blank before curving the same to form the rim and having its central portion broken away.

Fig. 5 is a similar side elevation of a bent blank provided with a tongue and slot connection for the ends thereof.

Fig. 6 is a fragmentary plan view of the wheel rim formed from a bent blank such as shown in Fig. 5, showing the inner face of the rim at the joint in the same.

Fig. 7 is an axial section of the hub of the wheel showing a modified form of bearing, instanced as a roller bearing.

Fig. 8 is a vertical section taken on the line 8—8 of Fig. 7.

Fig. 9 is an enlarged detail section taken on the line 9—9 of Fig. 8.

Fig. 10 is an axial section similar to Fig. 7, but showing a further modification of the bearing structure, instanced as a ball bearing.

Fig. 11 is a vertical section taken on the line 11—11 of Fig. 10.

Figs. 12, 13 and 14, are detail sections taken on the lines 12—12, 13—13, and 14—14 of Fig. 1, respectively.

The sides of the wheel are duplicates of each other, represented at 11, and are preferably formed from sheet-metal suitably punched and pressed, the sides, when secured together by suitable means such as riveting or welding, forming a hollow shell divided substantially in the medial plane of the wheel. Each side is preferably provided with punched-out portions 13, forming radial strips 14 between the same, the radial strips of each side of the wheel being connected at their inner ends by a hub-forming disk 15, and at their outer ends by an annular web 16.

Radial strips 14 are exemplified as provided with longitudinally extending outwardly curved strengthening ribs 20, having laterally extending lips 21 at each side thereof, the edges of lips 21 of the opposite radial strips of the respective sides 11, being inwardly curved and arranged to contact throughout their lengths as indicated at 22, thus forming hollow tubular spokes for the wheel.

A bearing supporting pocket is provided at the hub of the wheel, instanced as formed by outwardly flaring the hub-forming disks 15 of sides 11, to provide cylindrical shoulders 26 which are adapted to be pressed into contact with the bearing received in the pocket. Shoulders 26 preferably terminate in end-flanges 27 provided with central openings 28, through which a suitable axle 29 for the wheel is adapted to be received.

The inner ends of radially extending ribs 20 preferably merge into shoulders 26 as shown at 30, thus forming braces between the spokes and the bearing pocket, and the edges of hub-forming disks 15 between the spokes, are preferably inwardly curved to form a continuation of contacting edges 22 of the radial strips of the respective sides 11 of the wheel. The contacting edges 22 of the respective sides 11 may be secured together by any suitable means, such as electric welding.

The bearing for axle 29 adapted to be received in the bearing pocket at the hub of the wheel, may be either a solid bearing, a roller bearing, or a ball bearing. In the form of my invention illustrated in Figs. 1 and 2, a solid bearing is shown, instanced as comprising a tube 34 received in the bearing pocket of the hub, the outer periphery 35 of the tube being impinged by cylindrical shoulders 26, and the inner periphery 36 of the tube forming the bearing for axle 29. The bearing-tube is held against endwise movement, by the end-flanges 27 upon shoulders 26.

In the modification of my invention illustrated in Figs. 7, 8 and 9, a roller bearing for axle 29 is employed, instanced as comprising a tubular shell 37, the outer periphery 38 of which is impinged by shoulders 26, and the inner periphery 39 of which is spaced from axle 29 received through the hub, so that bearing-rollers 45 may be received between shell 37 and the axle, to form an anti-frictional bearing for the axle. The ends of the bearing-rollers 45 are exemplified as journaled in end-plates 40, which are instanced as provided with bearing openings 46 arranged to receive trunnions 47 up the respective ends of the rollers. The end-plates are provided with central openings 41, through which axle 29 is adapted to be received, and are preferably held in spaced relation proximate to the respective end-flanges 27 of the bearing-pocket, by connecting rods 42 secured to the respective end-plates.

In the form of my invention illustrated in Figs. 10 and 11, a ball-bearing for axle 29 is employed. The ball-bearing is exemplified as comprising bearing-collars 48 received in the bearing-pocket of the hub of the wheel, adjacent the respective end-flanges 27 thereof, the outer peripheries 49 of the bearing-collars being fixed within the respective ends of a shell 44, which latter is impinged by shoulders 26, and the inner peripheries thereof being spaced from but adjacent axle 29. A bearing-tube 50 is received in the bearing-pocket of the hub between the bearing-collars 48, the ends of the tube spaced from, but adjacent the respective bearing-collars 48. The proximate faces of collars 48 and tube 50 are correspondingly undercut to form annular raceways 52 between bearing-tube 50 and bearing-collars 48, the raceways being arranged to receive bearing-balls 53, to form an anti-frictional bearing for axle 29, which is received within the bore 51 of the bearing-tube 50.

The intimate connection between the solid bearing 34 and the annular shoulders 26 and end-flanges 27, in the solid bearing form of my invention, and between the shell 37 and end-plates 40 and said shoulders and flanges, in the roller bearing form of my invention, and between the shell 44 and collars 48 and said shoulders and flanges, in the ball-bearing form of my invention, each forms an oil tight joint at each end of the bearing for axle 29, and thus prevents seepage of oil from the bearing into the hollow spokes of the wheel.

The rim of my improved wheel is adapted to be supported at the periphery of webs 16, preferably by outwardly bending the outer edge portion of the respective webs to form laterally extending annular flanges 54 arranged substantially at right angles to the sides of the wheel. Bracing means for the flanges thus formed, are instanced as provided by extending ribs 20 of the spokes of the wheel across the webs 16, the hollows of said ribs being preferably open at the sides of the wheel, so that when webs 16 are outwardly bent to form flanges 54, the ends of ribs 20 will be similarly outwardly bent. The bends of the ribs are thus positioned in the angle formed between sides 11 of the wheel and the flanges 54, to form braces 55 for the flanges.

The rim for the wheel is adapted to be formed from a blank such as shown in Fig. 3, the blank being an elongated strip 56 of sheet-metal, having parallel side edges 57 and diagonally extending parallel ends 58. The intermediate parts of the side portions of the blank are reversely bent upon the central portion of the strip as shown at 59, to form the base of the rim, the edge portions of the said side portions having been bent at substantial right angles to the plane of the blank, these edge portions being arranged in contact with each other to form a central longitudinally extending flange 61.

The folded blank thus formed is of double thickness throughout, except at its ends. At each of its ends, single thickness portions are formed, due to the diagonal form of the ends of the blank, these single thickness portions extending lengthwise of the folded blank beyond the double thickness portions. Complemental spaces are formed in opposite ends of the folded blank, in which the single thickness portions are received when the folded blank is curved into annular form, for forming an overlapping joint whose mating end-faces extend diagonally across the longitudinally extending base portion and flange portion of the folded blank. In this manner lips 63 are formed at the respective ends of the folded blank at opposite sides of the median flange, which are received in recesses 64 at opposite ends of said folded blank at the other sides of said median flange when the folded blank is bent annularly. The end edges of said respective lips 63 are received against the portions of the diagonal end edges 58 which are at the opposite ends of the inner layers of the rim. Those portions of the diagonal end edges 58 at the outer rim thickness extend diagonally across the outer face of the rim, so that the bearing force upon said outer face, which in practice is parallel with the axis of rotation of the wheel, shall make only a point contact across said joint, the said joint forming a smooth contact surface, in that the bearing force upon the outer face of the rim will be throughout upon integral face-portions of said rim.

The joint thus formed by the overlapping of the ends of the bent and folded blank, extends diagonally across the contact surface or tread 62 of the rim, to form a smooth contact surface, and the ends of the rim overlap so as to form a staggered joint. A rigid connection may be made between the ends of the rim. The overlapping ends of the rim are adapted to be secured by suitable means, as by electric welding or riveting, or by providing one end of the overlapping ends of flange 61 with a tongue 65, which is adapted to be received in a slot 66 in the other end of the flange, and to be reversely bent upon the slotted end of the flange, as shown in Figs. 5 and 6.

The inner face of the rim as thus formed is adapted to be received upon the outer faces of flanges 54, with central flange 61 of the rim received between the sides 11 of the wheel, preferably in an annular recess 70, the inner edge of flange 61 bearing against the bottom 71 of said recess, which thus provides a central support for the rim. The wheel-rim may be secured to flanges 54 by suitable means, such as electric welding, or flange 61 of the rim, which is received in recess 70, may be secured by rivets 75 to webs 16 of the wheel, as shown in Fig. 13.

By the invention as thus described, a sheet-metal wheel is provided having a hub comprising a bearing-pocket pressed from the sides of the wheel into intimate contact with a bearing received in the pocket and forming an oil tight joint between the bearing and the interior of the wheel.

Further, a rim of novel construction is provided for the wheel having supporting and bracing means formed from the sides of the wheel, the rim being formed with an overlapping staggered joint at the connecting ends thereof, whereby a rigid joint and a smooth contact surface for the wheel is provided.

Having thus fully described my invention, what I claim as new and desire to secure by Letters Patent, is:

1. A wheel of the character described comprising a shell having sides and transversely extending peripheral flanges projecting at an angle from said respective sides, said sides and flanges at the respective sides of the wheel having ribs bent therefrom extending across said angles for forming bracing means for said peripheral flanges and open at the sides of the wheel.

2. A wheel of the character described comprising a pair of sides each comprising a blank of sheet-metal and having a bearing-portion, a rim portion and radial spokes connecting said portions, and openings between said spokes and portions, said portions and said spokes being integral with each other and having outwardly extending radial ribs extending lengthwise of said spokes and crosswise of said portions, the boundaries of said openings being inturned as flanges, the flanges of said pair of sides connecting with each other when said sides are assembled, and a rim comprising a blank of sheet-metal and having a median inwardly extending radial flange received between said rim portions of said sides, and the inner face of said last-named flange supported by said flanges at the outer boundaries of said openings.

3. A wheel of the character described comprising an annular rim including a sheet-metal blank having sloping ends and folded longitudinally and bent into annular form to form oppositely arranged single thicknesses of sheet metal at the respective ends of said blank, said oppositely arranged single thicknesses of sheet-metal overlapping each other to form an overlapping joint.

4. A wheel of the character described comprising a rim including a sheet-metal blank and having sloping ends and folded longitudinally and bent into annular form to form a double thickness of sheet-metal at the rim of the wheel and a double thickness flange extending inwardly radially from said rim, and the said flange and rim having a joint formed by overlapping sloping end portions of said folded blank.

5. A wheel of the character described comprising a rim including a sheet-metal blank having sloping ends, said blank folded longitudinally at the respective sides of its median longitudinal portion and bent into annular form to form an integral outer contact web, intermediate longitudinal portions bent backwardly from the respective side edges of said outer contact web upon the inner face of said outer contact web, and side-edge longitudinal portions bent radially from the inner edges of said intermediate portions and in contact with each other for forming a radially inwardly extending flange of said rim, the sloping ends of said blank overlapping one another and having end faces which extend slopingly across said outer contact web, and thence slopingly in opposite directions across said intermediate portions and said flange.

6. A wheel of the character described comprising a shell, an annular rim for said shell including a blank curved into annular form and having an inwardly extending flange comprising end portions arranged to overlap, and means for securing together said overlapping end portions to form a rigid joint for said annular rim.

7. A wheel of the character described comprising a shell and an annular rim for said shell including a blank comprising a base having side portions reversely bent upon said base, and end-lips upon said side portions arranged to form oppositely arranged recesses, said end lips received in said oppositely arranged recesses at the opposite ends of said side portions for forming a staggered joint.

8. A wheel of the character described comprising a shell, an annular rim for said shell which includes a blank comprising a base and a longitudinal flange extending beyond the ends of said base, the ends of said base having lips forming recesses and arranged to be received in said recesses at the opposite ends of said base to form a staggered joint, and the ends of said flange arranged to form an overlapping joint.

9. A wheel of the character described comprising a shell divided in the median plane of said wheel, a bearing pocket at the hub of said wheel, anti-frictional bearing devices for said wheel in said bearing-pocket, said bearing-pocket comprising outwardly flaring annular shoulders upon the sides of said shell, said bearing devices being impinged by said flaring annular shoulders, and means for preventing endwise movement of said bearing devices in said bearing-pocket.

10. A wheel of the character described comprising a shell, the sides of said shell comprising outer peripheral portions forming transversely extending annular flanges, and hub portions forming outwardly flared annular shoulders, the sides of said shell having radially extending ribs, the respective ends of said ribs and said annular flanges and annular shoulders respectively having outwardly extending bulges therebetween forming continuations of said radially extending ribs and forming braces between the sides of said shell and said annular flanges and shoulders respectively, and anti-friction bearing devices comprising a plurality of members having anti-friction parts therebetween, one of said members fixedly received in said outwardly flared annular shoulders.

11. The combination, in a wheel of the character described, of a shell comprising mating side-pieces each including a sheet-metal blank having a hub portion, a rim portion and spokes between said portions, said hub portion comprising a laterally extending annular wall and an outer annular flange forming a wall extending inwardly from said first-named wall forming a bearing-pocket when said shell is assembled, said spokes and said hub portion provided with outward ribs extending lengthwise of said spokes and crosswise of said hub portion, said spokes and portions being oppositely and matingly disposed when said shell is assembled for forming hollow spokes bracing said hub portion, and an anti-friction bearing received in said bearing-pocket and comprising a plurality of members having anti-friction parts therebetween, and one of said members extending integrally across the hollows of said spokes and fixed by one of said walls at each end thereof for preventing seepage of oil from said bearing into said spokes.

In testimony whereof I have hereunto signed my name in the presence of two subscribing witnesses.

WILLIAM F. PFAU.

Witnesses:
CHARLES E. WEBER,
THERESA M. SILBER.